United States Patent [19]

Berley

[11] 4,410,805
[45] Oct. 18, 1983

[54] RADIOMETER GENERATOR

[76] Inventor: Lawrence F. Berley, 19 Chipmunk La., Media, Pa. 19063

[21] Appl. No.: 918,772

[22] Filed: Jun. 26, 1978

[51] Int. Cl.$^3$ .............................................. F03G 7/00
[52] U.S. Cl. .................................... 290/1 R; 356/216
[58] Field of Search ............... 356/213, 216; 290/1 R; 60/641; 310/306; 73/355 R; 350/1.1; 250/215

[56] References Cited

U.S. PATENT DOCUMENTS

| 1,000,831 | 8/1911 | Martin | 356/216 |
| 2,004,392 | 6/1935 | Rah | 356/216 X |
| 3,348,374 | 10/1967 | Schalkowsky | 310/306 |
| 4,146,407 | 3/1979 | Litsenko et al. | 136/89 PC |

FOREIGN PATENT DOCUMENTS

| Ad.10769 | of 1890 | United Kingdom | 356/216 |
| 1395137 | 5/1975 | United Kingdom | 250/215 |

OTHER PUBLICATIONS

Series of papers published in the Philosophical Transactions of the Royal Society of London (1873–1881), par. 452.
"Radiant Matter", A Resume of the Principal Lectures and Papers by Prof. William Crookes on the Fourth State of Matter, published by James W. Queen & Co., No. 924, Chestnut Street, Philadelphia, Pa., pp. 6–9.

Primary Examiner—J. V. Truhe
Assistant Examiner—W. E. Duncanson, Jr.
Attorney, Agent, or Firm—John F. A. Earley

[57] ABSTRACT

A self-contained system embodying the principles of the radiometer, the otheoscope, and the dynamoelectric machine is provided to derive an output of electrical energy from an input of radiant energy, and in particular infra-red energy, from the surrounding environment, and for amplifying that output. The system is suitable for airborne and space as well as terrestrial applications.

27 Claims, 34 Drawing Figures

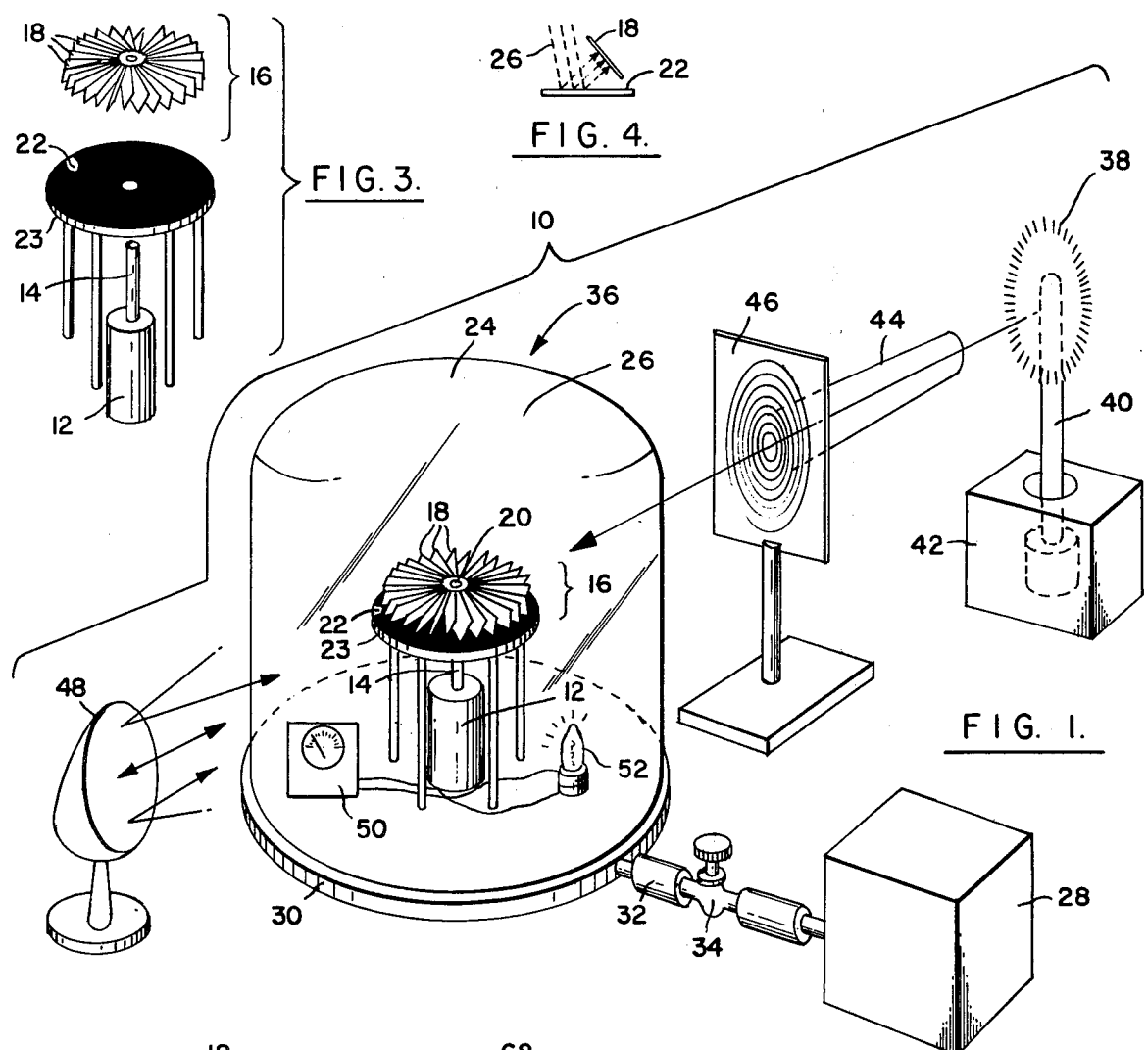
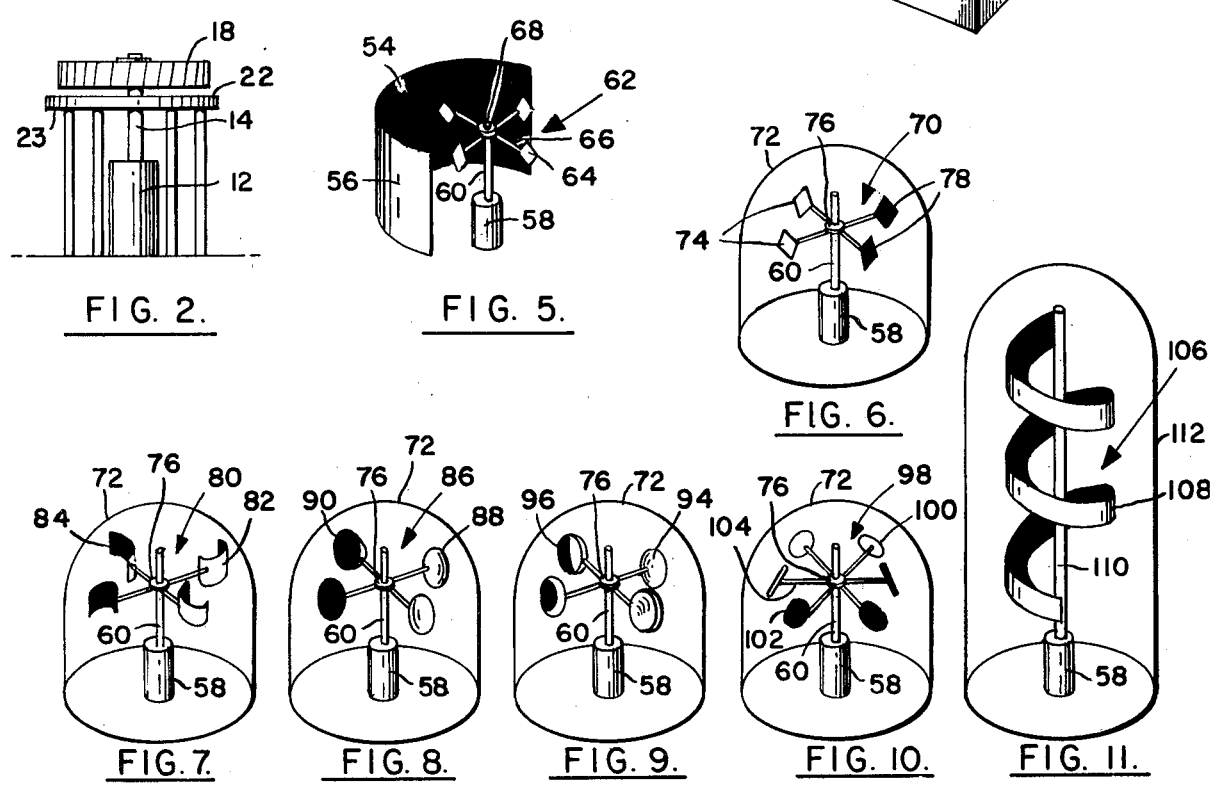

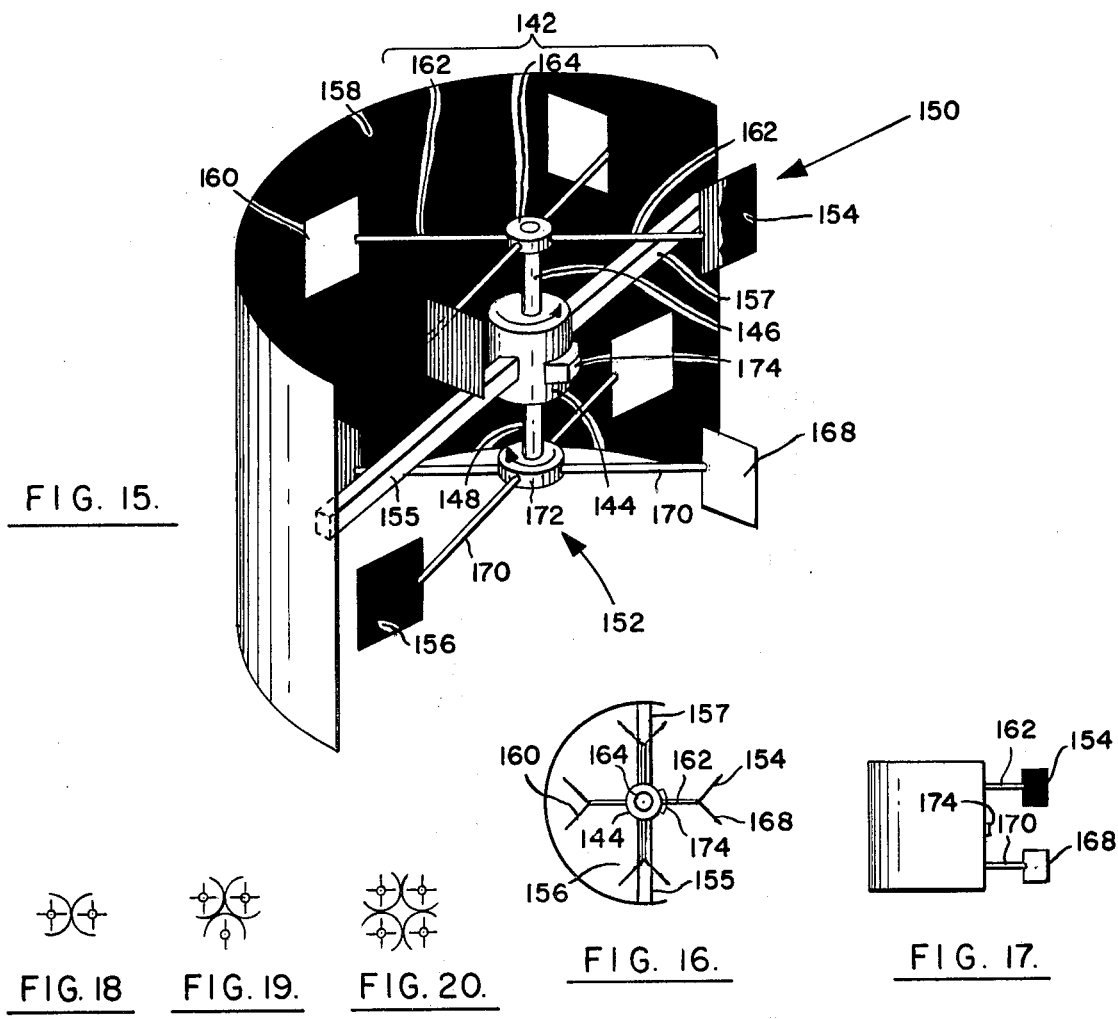
FIG. 15. FIG. 16. FIG. 17.
FIG. 18. FIG. 19. FIG. 20.
FIG. 21. FIG. 22. FIG. 23. FIG. 24. FIG. 25.
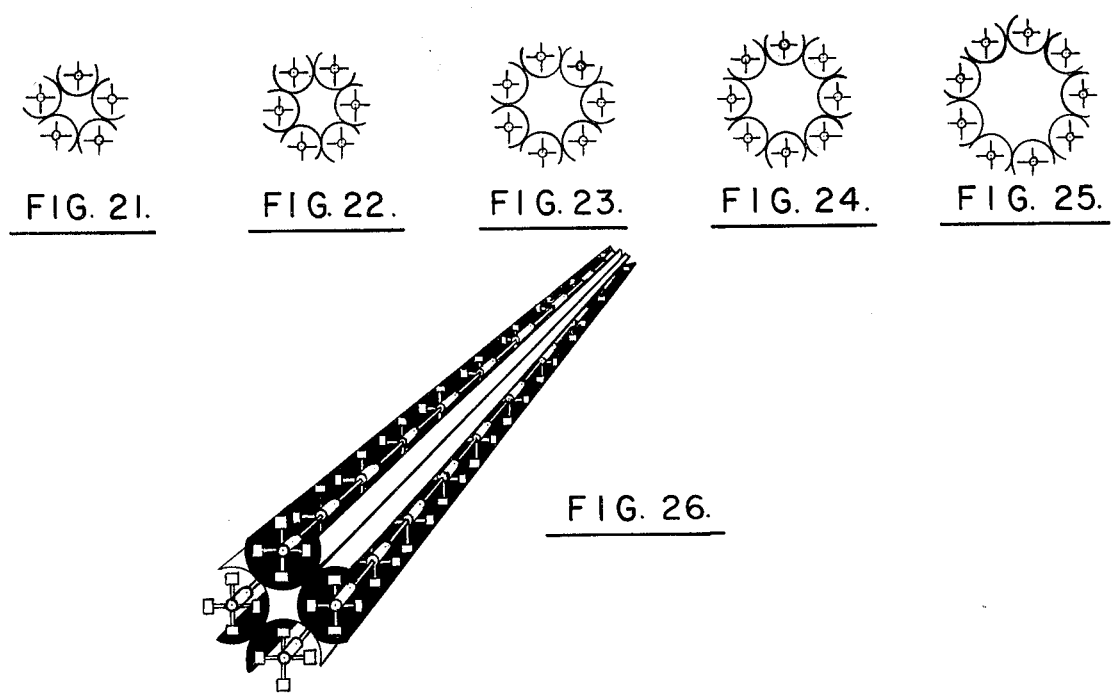
FIG. 26.

RADIOMETER GENERATOR

BACKGROUND OF THE INVENTION

1. Field of the Invention

The invention relates to a self-contained system for utilizing environmentally available radiant energy, specifically infra-red energy, to provide a new source of electrical energy.

2. Description of the Prior Art

Many proposals have been made in the prior art for the conversion of environmentally available radiant energy directly into electrical energy. Specifically, it has been proposed to use the thermoelectric, piezoelectric, and photovoltaic effects for this purpose. Typical U.S. patents showing such generators are U.S. Pat. Nos. 3,757,146 granted Sept. 4, 1973, 3,198,969 granted Aug. 3, 1965, and 3,296,469 granted Jan. 3, 1967. While the underlying principles of such generators have been known for many years, attempts at the utilization of these principles have been beset with problems that have impeded the development of such generators as practical sources of electrical power.

Other proposals for the conversion of infra-red energy into electrical energy have utilized the principle of the decrease in magnetism of bodies, particularly iron and certain other metals, alloys and their compositions as their temperature is increased. Generators embodying this principle are disclosed in U.S. Pat. Nos. 476,093, granted June 14, 1892 and 2,016,100 granted Oct. 1, 1935. Here, again, notwithstanding the apparent potential of such generators, the art has been unable to develop the technology as a practical electrical energy source. Among the problems involved with such generators is the complex and consequently expensive magnetic field structure that is required.

a phenomenon that has long been known as providing an output of kinetic energy from an input of radiant energy is the radiometer. The radiometer is an instrument that was devised by Sir William Crookes to measure the intensity of incident radiation. It operates on the principle that a body delicately suspended in a vacuum is apparently repelled by radiation. The instrument, in a commonly known form, includes a system of four spaced light-weight vanes of poor heat conductivity which are blackened on one side, the other side being bright, and so suspended in a highly exhausted bulb that they are free to rotate about a common vertical axis with the black surfaces all facing in the same direction. Incident radiation from the sun or an adjacent warm body is absorbed and emitted by the black surfaces of the vanes more than the bright surfaces, and as a result, gas molecules near the black surfaces are energized and press more on the black than the bright surfaces causing the vanes to rotate about their axis. The more intense the incident radiation, the more rapid is the rate of rotation. Actually, an outside source of lower temperature such as ice, dry ice, evaporating ether, or other cold material will draw radiant energy from the molecules causing them to move in the direction of the cold material, also driving the vanes. The container enclosing the vanes is necessary to maintain the high vacuum and to provide a barrier to rebound activated molecules back to the vanes, driving them further.

The radiometer is described in a series of papers that were published in the Philosophical Transactions of the Royal Society of London (1873–1881). Reference is made particularly to Paragraphs 145–148. The publication entitled "'RADIANT MATTER', A Resume of the Principal Lectures and Papers by Prof. William Crookes on the Fourth State of Matter", published by James W. Queen & Co., No. 924 Chestnut Street, Philadelphia Pennsylvania also is concerned with the phenomenon.

In another form of radiation responsive instrument which he called the otheoscope and that is described also in the aforementioned Philosophical Transactions, particularly in Paragraphs 450–454, Crookes provided a larger radiant energy absorbing and emitting surface consisting of a large stationary plate of good heat conductivity having a blackened surface. Thus, in the otheoscope the surface that generates the molecular disturbance is not the one that rotates. The blackened surface of the plate, however, is placed close to the movable vanes. Because of the larger surface area and closer proximity, the blackened stationary plate activates a greater number of molecules and directs them more accurately to the movable vanes resulting in a greater speed or rotation than is achievable by the radiometer with the same intensity of incident radiation. Another advantage of the otheoscope is that an enclosure is not necessary when a vacuum such as outer space is already present. The small space between the stationary blackened surface and movable vanes provide a rebounding space within which molecular rebound can occur and rebound off a container wall is not necessary to provide the moving force of the vanes. Another form of the otheoscope involved a stationary blackened disc above which light-weight blades radiating from a common center were positioned giving the appearance of a turbine.

Although the inventions of the radiometer and the otheoscope were made more than a hundred years ago, the only use proposed heretofore for the instruments and their inherent property of converting radiant energy into kinetic energy has been the measurement of the intensity of radiation falling upon them. That this available kinetic energy might be utilized to provide a useful electrical energy source has gone unnoticed. This notwithstanding the need for new energy sources and the intensive search for such new energy sources that has long been underway. Significant in this connection is the highly developed technology that has been available for the effective utilization of such kinetic energy, specifically the production of an output of electrical energy by the mechanical relative rotative motion of the magnetic field and the electrical conductors of the dynamoelectric machine.

SUMMARY OF THE INVENTION

An object of the invention is to bring together in a self-contained system apparatus embodying the principles of the radiometer, the otheoscope, and the dynamoelectric machine thereby to derive, as a new source of energy, an output of electrical energy from the dynamoelectric machine directly from an input of radiant energy to the system from the surrounding environment.

Another object of the invention is to provide such a self-contained system that is characterized by lightweight, thereby rendering it suitable for airborne and space as well as terrestrial applications.

A further object of the invention is to include in combination with such an electrical generating system a voltage amplifying device such as an induction coil.

A further object of the invention is to provide a series of such electrical generating systems each including a voltage amplifying device the output of which is utilized to provide a driving force for the succeeding stage.

Another object of the invention is to include in combination with such an electrical generating system and amplifying device self-contained photon-emitting devices, for example, solid materials such as gemstones and specially enclosed liquids and gases thereby to provide a self-contained photon-emitting device.

Still another object of the invention is to provide in a self-contained system, combination and cluster arrangements of such electrical generating systems and amplifying devices thereby to increase the electrical power output.

In accomplishing the foregoing objects and other objectives of the present invention, there are provided selfcontained radiometer and otheoscope generating systems for generating electrical energy from impinging or incident external environmental sources of radiant energy such as heat from the sun or any source of infrared radiant energy such as a heat pipe attached to a solar energy heat collector, an atomic pile, an airplane engine, or in general from heat derived in way from space, the air, land or water. The system will function as well if it is giving up radiant energy to a source much colder than it such as ice, dry ice, liquid nitrogen or evaporating fluids.

The system, in its specific aspects, includes an energy source such as a heat pipe, means for concentrating and directing the energy from the heat pipe including a collimator for directing and making parallel the rays of radiant energy to a fresnel lens and thereby to a radiant energy absorbing/emitting surface. There is also provided a parabolic, hyperbolic, or elliptical mirror for the further reflection of rays of radiant energy and then focusing them on the absorbing/emitting surface. The system further includes a dynamoelectric machine and torque converter which cooperates with the absorbing/emitting surface and nearby molecules to drive the dynamoelectric machine. Thus the incident radiant energy on the absorbing/emitting surface is converted to kinetic molecular energy and then to kinetic mechanical energy, specifically a moment to produce the relative rotative motion of the magnetic field and electrical conductors of the dynamoelectric machine. The dynamoelectric machine may comprise a machine of either the direct or alternating current generating type. The rotative moment at the output of the torque converter provides in cooperation with the dynamoelectric machine a capability for high electrical energy output in the form of high voltage or high electrical current. The system of the present invention is distinguished in this important respect from the prior art.

In accordance with one form of the invention, the radiant energy absorbing/emitting surface, torque converter and dynamoelectric machine are suitably mounted in a highly evacuated container. The collimator, fresnel lens and mirror may be located external of the container. The electrical output produced by the system may be employed to energize electrical components that may be located internally or externally of the container, as desired, or if desired, stored in batteries for future use. When utilized in outer space, the container may be omitted since no special provision is then required to provide the evacuated internal environment of the system. In this latter use, structures employing the principles of the otheoscope would be most effective, the close disposition of the stationary blackened surface and movable vanes providing the necessary space within which molecular rebound can occur. That is to say, a container wall is not necessary to provide the moving force of the vanes, as in the radiometer.

In another aspect of the invention advantage is taken of a special property of the highly evacuated internal environment of the system that solid materials such as gemstones, and specially enclosed liquids and gases, in such an environment may be caused to emit photons by virtue of the interaction of high-energy molecules and a spanning high voltage electrical field, thus providing a self-contained photon-emitting device. Such a device emits light rays useful as a beacon or for lighting living areas as a long term lamp that need not be turned off.

BRIEF DESCRIPTION OF THE DRAWINGS

FIG. 1 is a perspective view of an embodiment of the system of the present invention utilizing an otheoscopic generator;

FIG. 2 is a side elevation illustrating the radiation absorber/emitter, the torque converter, and dynamoelectric machine of FIG. 1;

FIG. 3 is an exploded perspective view of the apparatus of FIG. 2;

FIG. 4 is a side elevation illustrating the action of heated molecules emitted from the radiation absorber/emitter on a vane of the torque converter after absorption of radiant energy by the absorber/emitter;

FIG. 5 is a perspective view illustrating another form of otheoscopic generator that may be employed in the system of FIG. 1;

FIGS. 6 through 11 are perspective views illustrating different forms of radiometer generators that may be employed in the system of FIG. 1;

FIG. 15 is a perspective view illustrating another embodiment of the system of the present invention utilizing a dual otheoscopic generator and having particular application in outer space.

FIGS. 16 and 17 show top plan and side elevational views, respectively, of the system of FIG. 15;

FIGS. 18 through 25 illustrate top plan views of combination and cluster arrangements of the system of FIG. 15;

FIG. 26 illustrates a perspective view of a cluster arrangement of the basic FIG. 15 system;

DESCRIPTION OF THE PREFERRED EMBODIMENT

THE EMBODIMENTS OF FIGS. 1-11

Figure 12:
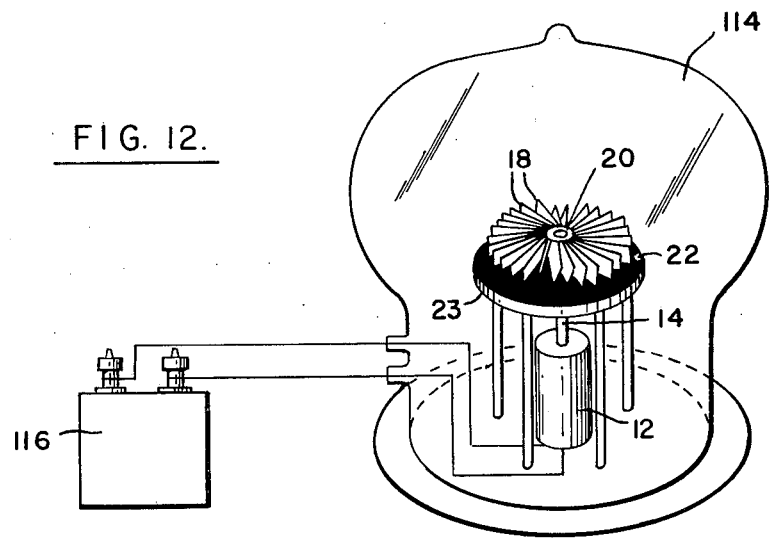
FIG. 12 is a perspective view illustrating a battery charging system according to the present invention.

Referring now to the drawings, and in particular to FIG. 1, there is shown an otheoscopic generator comprising a self-contained system indicated at 10. This system requires no external power for its operation, other than environmental incident radiation, for converting such incident radiation into useful electrical energy and other desired forms of radiant energy. The system includes a dynamoelectric machine or generator 12 having a drive shaft 14. The output electrical current from the generator 12 can be alternating or direct, as desired. In FIG. 1, the generator 12 is shown as a miniature direct current generator having minimal inertial turning resistance of the shaft, minimum armature resistance, and an output voltage of 1.8 volts per 1000 RPM. A permanent magnet not shown provides an internal magnetic field. Where subsidiary current to maintain an internal magnetic field is required, a suitable additional otheoscopic generator of the type herein illustrated in FIG. 1 would be added to provide such current.

The system of FIG. 1 further includes a torque converter indicated at 16 comprising a light-weight circular aluminum fan having a bank or plurality of light-weight vanes 18 each approximately 1/32" thick radiating from a center disc 20 attached perpendicularly to the vertically positioned drive shaft 14 of generator 12, as for example, with epoxy glue.

A radiant energy absorber/emitter surface indicated generally by the reference numeral 22 may consist of lampblack painted on the upper side or surface of a plate 23 facing the torque converter 16. The plate 23 preferably is made of a good heat conductor such as silver, gold, copper or aluminum. A desired property of the blackened surface is high absorbancy and emission of infra-red radiant energy. Material other than lampblack may be employed to provide the desired high absorbant black surface 22 for the plate 23, as is known in the art.

The generator 12, torque converter 16 and plate 23 with its absorber/emitter surface 22 are positioned within a Bell jar 24, being suitably mounted therein. The internal environment 26 of the Bell jar 24 consists of molecules representative, for example, of normal sea level air or other gas mixtures by design evacuated to a high vacuum of 15 to 100 microns of mercury pressure. (Note that at 1 micron of mercury pressure there are still 400 billion molecules per cubic centimeter of vacuum space.) To this end, in FIG. 1, there is provided a vacuum pump 28 that is attached to the Bell jar 24 by way of a suitable platform or base plate 30 on which the Bell jar 24 is mounted, and also by way of a vacuum hose 32 and high vacuum stop cock 34.

The environment external of the Bell jar 24 is the normal sea level air for the region in which the Bell jar 24 is located under the influence of various climatological and geophysical factors such as temperature, humidity, pressure, gravitational, electrical, and magnetic field gradients. This environment contains many natural sources of radiant energy indicated generally at 38, including the sun. The energy source 38 chosen for purposes of illustration in FIG. 1 is a 12" heat pipe 40 that is arranged to transfer heat energy from heated water stored in an insulated container indicated at 42. The environment shown also includes a short collimator 44 that is provided to direct and make parallel the rays of radiant energy from the close source of radiant energy, the heat pipe 40. The collimator 44 directs the radiant energy to a fresnel lens 46 having plane dimensions of approximately 12" on a side and ⅛" thick. The fresnel lens 46 concentrates the radiant energy as it is directed toward the absorber/emitter surface 22 and focuses the energy thereon. A parabolic mirror 48 provided on the other side of the Bell jar 24 also reflects radiant energy impinging upon it from the source 40 and focuses it directly on the absorber/emitter surface 22. Hyperbolic or elliptical mirrors may also be employed.

In FIG. 1 a suitable electrical meter 50 connected to the output of the generator 12 provides a measure of the output of the generator 12. This output is in the form of a voltage or amperage, as desired. Additionally, a penlight lamp 52, rated at 5 volts and 60 microamperes, is shown as being energized by the output from the generator 12.

As those skilled in the art will understand, the absorber/emitter surface 22 and torque converter 16 provide in combination with the generator 12 a capability, in an installation in outer space, for substantial electrical energy output in the form of voltage or electrical current depending upon the electrical design parameters of the generator 12. Thus, while in FIGS. 1-3 the generator 12 is described as a miniature direct current generator, this is because of physical limitations imposed by housing the structure of the absorber/emitter surface 22 and torque converter 16 within the Bell jar 24. If housed in a larger container and thus freed of its physical constraints, or located in outer space wherein no housing or container would be required to provide the evacuated space, the torque converter 16, vanes 18 and absorber/emitter surface 22 may be made of such size as to provide a substantially larger turning moment on the center disc 20. In this case the absorber/emitter surface 22 would be separate but close to vanes 18 and center disc 20. Accordingly, the drive shaft 14 and generator 12 may then be increased proportionately in size to provide a correspondingly enhanced output of electrical energy.

The otheoscopic torque converter of FIGS. 1 through 4 is characterized in that the vanes 18 may be transparent so as to allow a substantially unimpeded impingement of radiation on the surface 22 of plate 23 and is further characterized in that the surface 22 that generates the molecular activity in response to incident radiation is stationary, and therefore, is not restricted as to material, weight, shape, size and area of surface. Accordingly, the most suitable heat conducting material and the most efficient size, shape, weight and means of support for the plate 23 can be employed to the end of utilizing the incident radiation to best advantage. The vanes 18 of the torque converter 16, moreover, can be located very close to the surface 22, preferably within a millimeter or two, and the angular position of the vanes 18 with respect to the surface so chosen as to take the most efficient mechanical advantage of the radiation produced "molecular wind", as it was termed by Crookes, and as illustrated by way of example in FIG. 4.

In FIGS. 1 through 3 the stationary plate 23 on which surface 22 is provided is shown as supported on vertical ports that rest on the base plate 30, and the vanes 18 of the torque converter 16 are disposed in a fan shaped configuration close to the surface 22, each vane presenting itself to that surface as illustrated in FIG. 4.

Another form of otheoscopic torque converter that may be employed in the system of FIG. 1 is illustrated in FIG. 5 wherein the surface that generates the molecular activity in response to incident radiation, indicated at 54, is provided on a metal sheet or plate 56 that is curved to provide a semi-circular cylindrical portion having as its axis the shaft of a dynamoelectric machine or generator 58 having a vertically positioned drive shaft 60. Generator 58 and shaft 60 may be identical to the generator 12 and shaft 14, respectively, of FIGS. 1 through 3.

The arrangement of FIG. 5 further includes a torque converter indicated at 62 comprising four light-weight, transparent diamond-shaped vanes 64 each approximately 1/32" thick, that are attached to the end of a respectively associated rod 66. The rods 66 radiate from a center disc 68 that is attached perpendicularly to the end of drive shaft 60 in any suitable manner. Each vane 64, as shown, is vertically positioned on the end of its associated rod 66, being disposed at an angle displaced from normal with respect thereto, and in each revolution about the axis of shaft 60, passes close, within a millimeter or two, to the molecular generating surface 54. The angle of each vane 64 with respect to surface 54 is similar to that between vane 18 and surface 22, as illustrated in FIG. 4, and thus molecular activity at the surface 54 produces a moment that causes the vane 64 to move with respect to the surface 54, thus producing rotation of shaft 60. The direction of rotation of the shaft 60 depends upon the direction from normal of the angle of the vane 64 with respect to its supporting radial rod 66, the angle preferably being the same for each of the vanes 64.

If employed in an environment such as outer space where vacuum conditions exist naturally, it is not necessary to enclose the otheoscopic torque converter 62 within an evacuated container such as Bell jar 24 of FIG. 1. When not so employed, the converter 62 would be positioned in an environment such as that provided by Bell jar 24 with the generator 58 and the curved plate 56 suitably supported on the base plate 30.

FIGS. 6 through 11 illustrate alternative radiometric forms of torque converters that may be employed in place of the otheoscopic torque converter in the system of FIG. 1. The radiometer generators of FIGS. 6 through 11 differ significantly from the otheoscopic torque converter in that the absorber/emitter surface is embodied on the moving members or vanes of the generator instead of on the stationary member, and differs further, as will become apparent, in the requirement for an enclosing wall of the evacuated space to be close to the path of the moving vanes. That is to say, where the absorber/emitter surface is on the moving vanes of the torque converter, an enclosure or wall of the evacuated space must be placed close to the vanes for the latter to be driven when exposed to radiant energy. As noted in connection with the otheoscopic torque converter of FIG. 1, when the absorber/emitter is provided on a surface separate from the movable vanes, the vanes need not have any lampblack coating.

Each of the apparatus embodiments of FIGS. 6 through 11 includes a glass container within which the moving vane system and dynamoelectric machine are placed, which container, in turn, would be placed inside a Bell jar such as the Bell jar 24 of FIG. 1 and evacuated, also, together with the bell jar.

As illustrated, the torque converter 70 of FIG. 6 is enclosed in a glass container 72 and includes four light-weight vanes 74 each approximately 1/32" thick radiating from a center disc 76 attached perpendicularly to a vertically positioned drive shaft 60 of a generator 58 that may be identical to the correspondingly numbered components of FIG. 5. One side 78 of each of the vanes 74 is blackened, as with lampblack, the black surfaces all facing in the same direction around the torque converter. The other sides of the vanes are bright. Preferably the material of which the vanes 74 of FIG. 6 are made, and the vanes of the torque converters described in connection with FIGS. 7 through 11 are made, is a poor heat conductor to the end that the high absorbance of infra-red radiant energy on the black side has little or no effect on the temperature of the bright side.

Radiant energy, and in particular, infra-red energy is differentially absorbed and emitted by the blackened surfaces of the torque converter vanes imparting kinetic energy to adjacent gas molecules. The lack of a similar energy exchange between the obverse bright surface and its adjacent gas molecules results in a pressure differential whereby the more energetic gas molecules close to the blackened surface of the vanes give rise to a resultant driving force turning or rotating the center disc 76.

FIG. 7 illustrates a torque converter 80 that is similar to that of FIG. 6, but includes vanes that consist of semicircular metal foils, as indicated at 82. The foils 82 are each blackened on one side indicated at 84, the blackened sides all facing the same direction as in torque converter 70 of FIG. 6 and also in the torque converters illustrated in FIGS. 8 through 10.

The vanes of the torque converter 86 of FIG. 8 consists of hemispheric cups 88 each of which is blackened on the inside indicated at 90, all facing the same direction.

The vanes of the torque converter 92 of FIG. 9 comprise hemispheric cups indicated at 94. Each cup 94 is provided with a blackened screen 96 that covers the outer half of each cup 94.

The FIG. 10 form of torque converter 98 is a "turbine" form and includes elliptically shaped vanes or plates 100 that present a substantially circular outline in the primary direction of the radiation source. The plates 100 are blackened on the outer faces indicated at 102, and are oriented at 45° from the vertical, and also from the rods 104 on the ends of which plates 100 are mounted. The apparatus embodiment of FIG. 10 allows for continuous exposure of the absorber/emitter surfaces 102 of the vanes 100 to incident light and does not require the spacing of the vanes illustrated in connection with the apparatus embodiments of FIGS. 6 through 9.

The torque converter 106 of FIG. 11 includes a single elongated vane 108 of spiral form that is exposed to incident radiant energy emanating from almost any direction. In FIG. 11, generator 58 is provided with an elongated shaft 110 to the remote end of which one end of of vane 108 is attached, the other end of the spiral of vane 108 being connected to the shaft 110 adjacent the generator 58. As illustrated, the glass container, indicated at 112, for torque converter 106, is elongated and shaped to conform to the general outline of the spiral vane 108.

THE EMBODIMENTS OF FIGS. 12 THROUGH 14

In FIG. 12 there is illustrated another embodiment of the invention in which a glass container 114 that may be similar in size to an ordinary household light bulb is employed, and which embodies the otheoscopic form of torque converter illustrated in FIG. 1. The glass container 114 is hermetically sealed after placement of the generator system therein and evacuation of the internal environment to 1 to 100 microns of mercury pressure (preferably one micron). The output terminals of generator 12, in FIG. 12, are shown connected to an electrical storage device or battery 116 for charging the latter, the electrical charge stored in battery 116 being available for later use.

Figure 13:
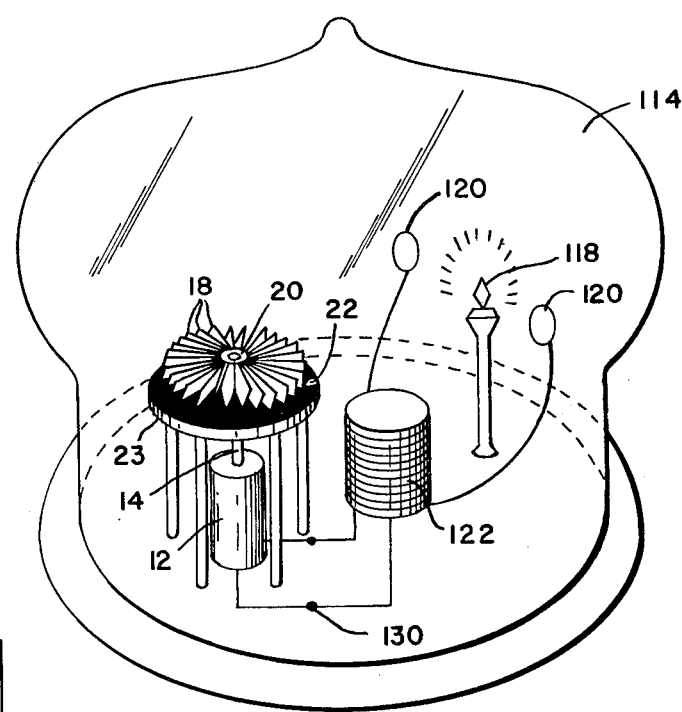
FIG. 13 is a perspective view of a self-contained photon-emitting system according to the present invention.

FIG. 13 illustrates a further embodiment of the invention employing a container 114 of FIG. 12 and the otheoscopic form of torque converter of FIG. 1 wherein a gemstone 118 is positioned between two spaced plate electrodes 120. The electrodes 120 are connected to the high voltage output of an induction coil indicated at 122 and actuated by the output of the generator 12.

Figure 14:
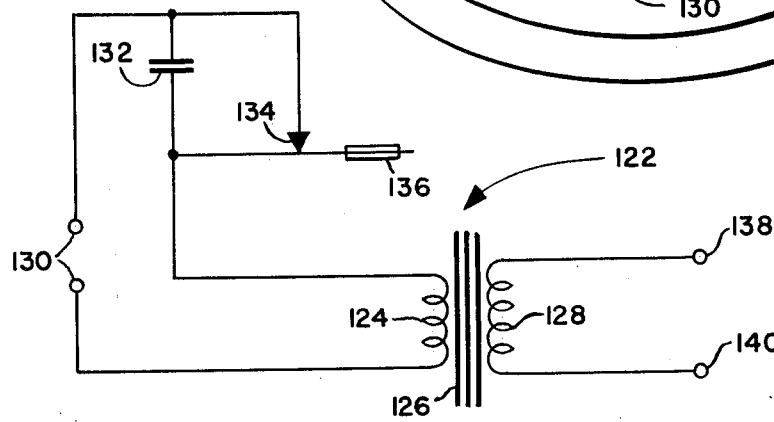
FIG. 14 is a wiring diagram illustrating a typical form of induction coil that may be used in the system of FIG. 13.

A typical electrical circuit for the induction coil 122 of FIG. 13 is illustrated in FIG. 14. As shown, the induction coil 122 includes a primary winding 124, consisting of only a few turns, wound on an iron core 126. A secondary winding 128, wound over the primary winding, consists of a large number of turns. The primary winding 124 is connected to the output terminals 130 of the generator 12 in series with an electrical capacitor 132. An electrical switch 134 actuated by an armature 136 is connected across the capacitor 132. The armature 136 is positioned in cooperative relation with the iron core 126, being normally biased in upward direction to close the switch but is attracted by the iron core 126, upon magnetization of the latter, to open the switch 134 and thereby break the circuit to primary coil 124. As a result the armature 136 is returned to its initial position by a spring, not shown, and closes switch 134, again restoring the circuit to the primary coil. The cycle is rapidly repeated.

In the operation of the induction coil, the flow of electrical current in the primary winding 124 produces a magnetic field in the iron core 126. Opening of switch 134 results in a collapse of the magnetic field that induces a high voltage in the secondary winding 128. The capacitor 132 is placed across the switch 134 to reduce the voltage across the switch as it is opened to minimize sparking.

The output terminals 138 and 140 of the secondary winding are each connected electrically to one of the electrodes 120. Hence, there is established between the electrodes 120 an electrical field in accordance with the A.C. high voltage output of the induction coil 122. The gemstone 118, although a solid material, has the property of emitting photons in the environment described and thus provides a self-contained photon-emitting device.

THE EMBODIMENT OF FIGS. 15 THROUGH 26

When positioned in outer space, it is noted that unless the generator 12 is mounted on a stable platform 30 that is able to resist the turning or rotative moment resulting from radiation impinging on the absorber/emitter surface 22, there is a tendency for the rotative moment to be applied to the generator 12 itself as well as to the drive shaft 14 thereof. Consequently, after a time the absorber/emitter surface 22, torque converter 16, drive shaft 14 and generator 12 will all effectively be rotating as a unit. As a result, there will first be a depletion and then, after a time, no generation at all of electrical power. This undesirable situation may be corrected, as indicated, by mounting the generator 12 on a stable platform that effectively resists such turning or rotative moments, and hence, holds the body of generator 12 stationary with respect to the relatively rotating shaft 14, torque converter 16 and absorber/emitter surface 22. In outer space, when the blackened absorber/emitter surface remains part of the system of movable vanes 18, an enclosure or shroud must be provided to return high energy molecules to further drive the vanes 18 in a rotary motion. Such an enclosure is not required with the otheoscopic form of generator in which the absorber/emitter surface is part of the stationary system.

The embodiment of the invention illustrated in the perspective view of FIG. 15 and in top and side views, respectively, of FIGS. 16 and 17, shows another way in which to arrange a radiation generator system so as to avoid the need for a platform to hold the body of the generator stable with respect to the associated drive shaft torque converter and absorber/emitter. The radiation generator system 142 of FIG. 15 includes a dynamoelectric machine or generator 144 having a pair of drive shafts 146 and 148, a pair of torque converters 150 and 152, and a pair of absorber/emitter surfaces 154 and 156.

The generator 144 can provide an output of alternating or direct current as desired. Desirably, in the apparatus embodiment of FIG. 15, the generator 144 comprises two separate generators, each having its own rotatable armature, the magnetic field sections thereof being fastened together and arranged within and fastened to the same external, common casing. The drive shaft 146 is attached to the rotatable armature of one generator. The drive shaft 148 is attached to the rotatable armature of the other generator, being axially in alighnment with the drive shaft 146. The common casing of the generators is supported by brace members indicated at 155 and 157, between the ends of a curved absorber/emitter surface 158, at the center of curvature thereof.

The torque converter, indicated at 150, comprises a plurality of vanes 160 extending from the ends of rods 162 radiating from a center disc 164 that is attached perpendicularly to the end of drive shaft 146 in any suitable manner. The vanes 160, as shown, are positioned parallel to the shaft 146 and are so arranged as to have an edge pass close, within a millimeter or two, in each revolution about shaft 146, to the curved absorber/emitter surface 158 that may be similar to the surface 54 of FIG. 5. The angle of each vane 160 with surface 158 in such that molecular disturbance at the surface 158 produces a turning on the drive shaft 146, in the counter-clockwise direction, for example. Additionally, one side of each vane 160 is blacked to provide absorber/emitter surface 154. This provides a supplemental turning movement in the counterclockwise direction on the drive shaft 146.

Similarly, the torque converter, indicated at 152, comprises a plurality of vanes 168 extending parallel to drive shaft 148 from the ends of rods 170. The rods 170 radiate from a center disc 172 that is attached, in any suitable manner, perpendicularly to the end of drive shaft 148. The vanes 168 are positioned parallel to drive shaft 148 and arranged to have an edge pass close, within a millimeter or two, to the curved absorber/emitter surface 158. The angle presented by each of the vanes 168 to the surface 158, however, is opposite to that of the vanes 160 of the upper torque converter 150, whereby incident radiation tends to produce clockwise rotation of drive shaft 148. Additionally, if desired, one side of each of the vanes 168 is blackened to supplement the turning moment of drive shaft 146, the blackened sides being oppositely disposed with respect to blackened sides of vanes 160 of torque converter 150.

With this construction, it is evident that any tendency of the rotative moment introduced by one of the torque converters 150 and 152 to rotate the common casing of dual generator 144 is offset or counterbalanced by the rotative moment on the generator casing by the other torque converter thereby providing a substantially balanced system.

The arrangement of FIG. 15 is further advantageous in that the generator 144 effectively comprises two separate generators the outputs of which may be combined whereby a correspondingly larger electrical output is obtained. The output of the generator 144 may be utilized, for example, to energize a device 174 suitably mounted on the body of the generator 144, externally thereof, as indicated. The device 174 may comprise a lamp providing a beacon, for example, a microwave generator transmitting generated power to receiving antenna or earth, or a radio transmitter transmitting intelligence concerning space environmental factors sensed by detecting devices not shown but supported and electrically powered by the otheoscopic generator 142. Alternatively, or in addition thereto, the electrical output of the generator 144 may be taken via suitable slip rings provided on the appropriate shaft 146 or 148.

Another way in which the radiation generating system of FIG. 15 may be arranged so as to be balanced, thereby avoiding the depletion, after a time, of generation of electrical power is to employ but a single generator 144 having two drive shafts 146 and 148 that are axially aligned but extend in opposite directions. With this structure the brace members 155 and 157 for supporting the generator 144 would be carried by a band (not shown) encircling the casing of the generator and disposed, for example, in a groove to preclude vertical displacement but to allow rotation of the casing of the generator relatively to the band and the brace members. One drive shaft 146 of the generator 144 would serve, for example, as the drive shaft 146 of upper torque converter 150 and would be attached to the rotatable armature of the generator. The other drive shaft 148 would be attached to the lower torque converter 152 and also to the body or casing of the generator 144. It is evident that since the turning moments on the two shafts would be in opposite directions that the system would be balanced and would continue to provide an electrical output irrespective of whether one turning moment were greater than the other. The electrical outputs of the two generators could be connected in parallel or series, as desired.

In accordance with the invention, it is contemplated that otheoscopic generating systems of the kind illustrated in FIGS. 15 through 17 may be arranged in groups or clusters to increase the electrical power output. Thus, FIGS. 18 through 25 illustrate top plan views of combinations of whole system units, from two to nine, each of which may be identical to the structure of FIG. 15, except for the inclusion on each system unit of a device 174. FIG. 26 shows a perspective view of constructions linking four whole system units into chains. Other numbers of whole system units may be provided, the chains may be of any length for outer space use. If desired, such chains may be deployed in a star configuration thereby providing desired structural strength as well as contributing to a further increase in electrical power output.

As illustrated in FIG. 26, it is contemplated that the curved absorber/emitter surfaces would extend, suitably supported, the entire length of each chain. Additionally, more than one set of vanes 160 may be associated with each drive shaft 146 and more than one set of vanes 168 may be associated with the drive shaft 148. With this arrangement, there is made available a significant increase in the energy for driving each of the generators making up the dual generator 144. It will further be understood that the kinetic energy outputs of the entire four and if desired, five or more whole system chains that could be provided, may be utilized in parallel, by the provision of suitable gearing, to provide an even more powerful total output.

Figure 27:
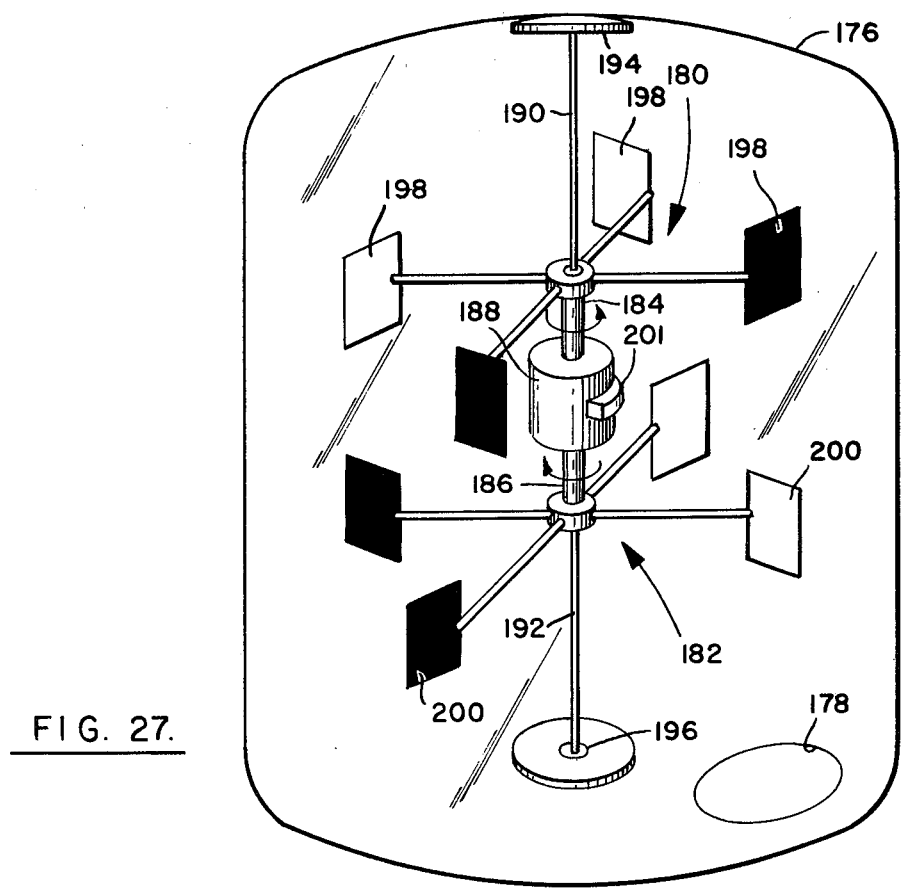
FIG. 27 illustrates an embodiment of a dual radiometer generator for outerspace use that is enclosed in a glass or other heat conducting container.

FIG. 27 illustrates an embodiment of the radiometer generator system of the present invention for outer space use. This system is enclosed in a container 176 that is transparent to infra-red radiation, which container may be glass and may be provided with an opening 178 in the wall to facilitate evacuation to the level of outer space. The system includes two torque converters 180 and 182 that are arranged to rotate oppositely disposed drive shafts 184 and 186 of a generator 188. The body of generator 188 is directly connected to drive shaft 184, while the armature of the generator is connected to the drive shaft 186.

The radiometer generator system of FIG. 27 is rotatively suspended in the container 176 by upper and lower suspension members 190 and 192, respectively. Thus, as shown, upper suspension member 190 extends between the upper end of drive shaft 184 and a disc 194 that is attached to the wall of container 176. Lower suspension member 192 extends between the lower end of drive shaft 186 and a disc 196 that is attached to the opposite wall of container 176.

The torque converters 180 and 182 are shown as of the type illustrated in FIG. 6, and include four lightweight vanes indicated at 198 and 200, respectively. One side of each of the vanes is blackened and the other is bright, the black sides of vanes 198 all facing in the same direction, the clockwise direction, as shown, and the bright sides of vanes 200 all facing in the counterclockwise direction. As a result, radiant energy differentially absorbed and emitted by the blackened surfaces of the vanes 198 and 200 impart kinetic energy to adjacent molecules to provide a turning moment on the drive shafts 184 and 186 of generator 188 in the counterclockwise and clockwise directions, respectively. A device 201 that may be similar to the device 174 of FIG. 15 may be provided for utilizing the electrical output of generator 188.

It will be understood that combinations of whole systems units, each identical to the structure of FIG. 27, may be provided. Such combinations may be similar to those illustrated in FIGS. 18 through 25. Additionally, similarly to the constructions of FIG. 26, the structure of FIG. 27 may be embodied in constructions linking two and more whole system units into elongated chains.

Figure 28:
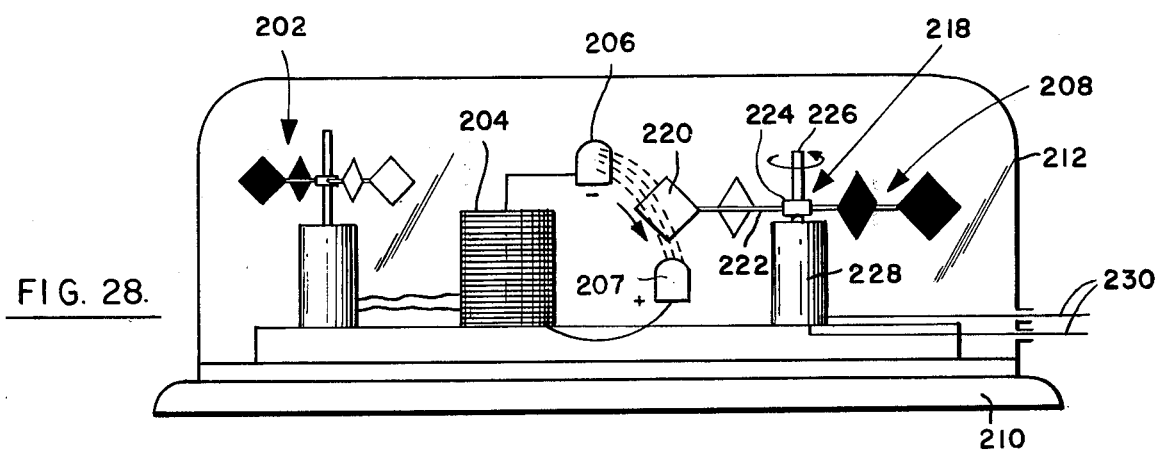
FIG. 28 illustrates an embodiment of the radiometer generator and induction coil as a power amplifier.

FIG. 28 illustrates a power amplifier embodiment of the present invention in which the output voltage of a radiometer generator system 202, which may be similar to that illustrated in FIG. 6 is amplified by an arrangement consisting of an induction coil 204, a pair of spaced electrodes 206 and 207, and a second radiometer generator system 208, the entire system being mounted on a base plate 210 and enclosed in a glass container 212 that has been appropriately evacuated, as previously described.

Figure 29:
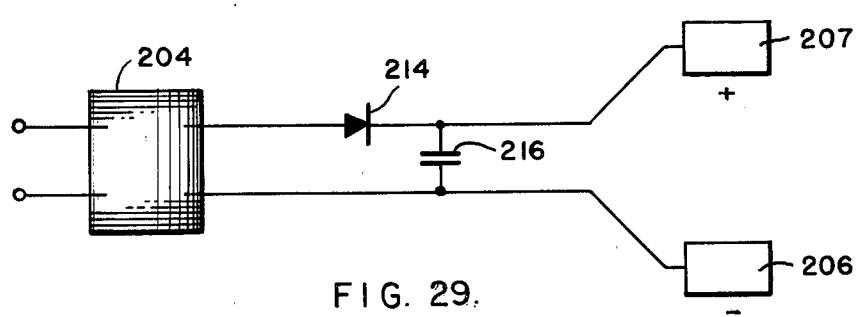
FIG. 29 shows a diode rectifier circuit for use with the apparatus embodiment of FIG. 28.

The output terminals of radiometer generator system 202 are connected to the input terminals of the induction coil 204 and the high voltage output terminals of the latter are connected through a suitable diode rectifier 214 to the terminals of a high voltage capacitor 216 as shown in FIG. 29, the terminals of capacitor 216 being connected to the electrodes 206 and 207. While shown as of the solid state variety, the rectifier 214 may be of the vacuum type. The induction coil 204 may be similar in construction to the induction coil 122 that has been described by reference to FIGS. 13 and 14. The high voltage alternating current output of induction coil 204, however, is converted to direct voltage by rectifier 214 and capacitor 216.

The radiometer generator system 208 may be similar in construction to the generator system of FIG. 6, but preferably includes a torque converter 218 in which vanes 220 are somewhat larger, and moreover, are supported on the ends of rods 222 at a greater radial distance from a center plate 224 that is attached perpendicularly to the end of a drive shaft 226 of a dynamoelectric machine 228 having a greater output than generator of system 202.

As illustrated the electrodes 206 and 207 are so spaced and so positioned with respect to the circular path transversed by the vanes 220 as to intercept a substantial portion of that path without, however, providing any physical obstruction to the movement of the vanes 220. The polarity of the high voltage applied to electrodes 206 and 207 is such as to make electrode 207 positive with respect to electrode 206 whereby a high voltage molecular stream is established in the direction indicated by the arrow in FIG. 28. This molecular stream or flow of electrons between the electrodes impinges upon each of the vanes 220 as they successively traverse an arcuate path between the electrodes, thereby to produce a turning moment on the drive shaft 226 in the counterclockwise direction, as illustrated. This turning moment supplements the turning moment produced on the drive shaft 226 by the effect of radiation impingement upon the blackened surfaces of the vanes 220, one side of each vane 220 being blackened and the other being bright and with the blackened surfaces all facing in the same direction, that required to produce a counterclockwise turning moment. Hence, the high voltage molecular stream enables the turning of the generator 228 to provide an electrical output greater than that obtainable from the generator of radiometer generator system 202. The amplified power output from generator 228 is available from terminals 230 thereof.

Figure 30:
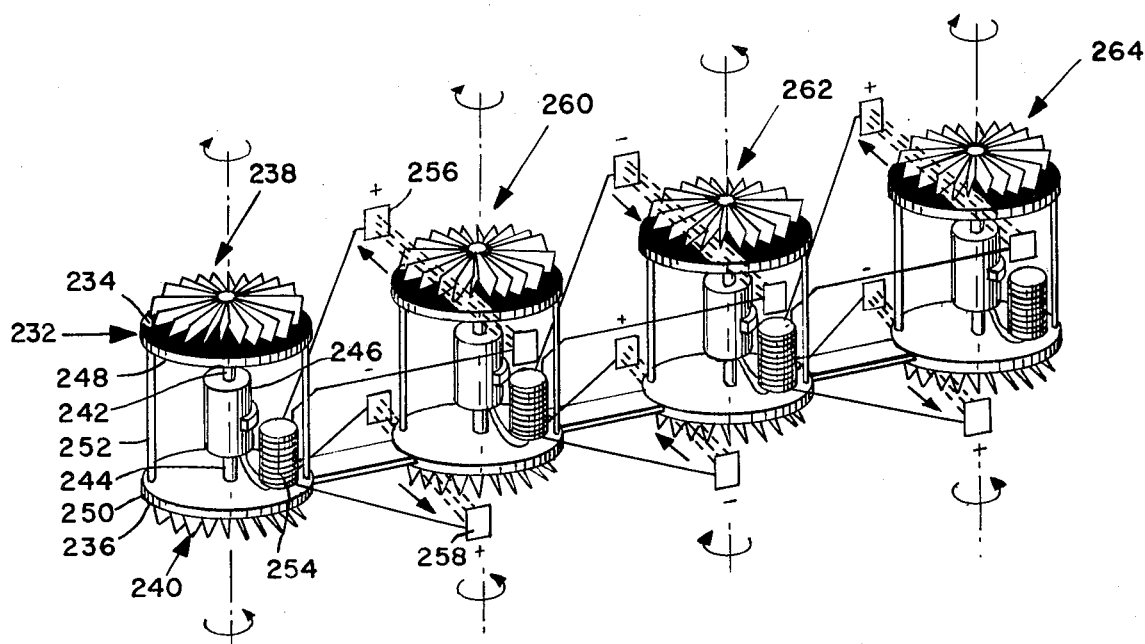
FIG. 30 illustrates an embodiment linking dual otheoscopic generator power amplifiers into a chain thereby providing increasingly more powerful generators.

FIG. 30 illustrates an embodiment of the otheoscopic form of radiation generator for use in outer space wherein dual otescopic generators are utilized with associated induction coils to provide power amplifiers, and wherein the power amplifiers are linked into a chain or brigade to produce increasingly higher electrical fields to drive increasingly more powerful generators.

Specifically, there is provided in FIG. 30 a first dual otheoscopic generator indicated at 232 consisting of respective upper and lower radiant energy absorber/emitter surfaces 234 and 236, respective upper and lower torque converters 238 and 240, respective upper and lower drive shafts 242 and 244, and a common dynamoelectric machine 246. Each of the otheoscopic generators may be similar to that illustrated and described by reference to FIG. 1. Thus, the absorber/emitter surfaces 234 and 236 may each consist of a blackened surface provided on a respectively associated plate 248 and 250 which are disposed in parallel relation to each other, rigidly supported by suitable rods 252. The surfaces 234 and 236 are respectively associated with torque converters 238 and 240, each of the latter comprising a fan shaped bank or plurality of light weight vanes radiating from a center disc which, in turn, is attached perpendicularly to a respectively associated drive shaft 242 and 244. The upper drive shaft 242, similarly to the arrangement of FIG. 15, is attached to the armature of a first generator, while the lower drive shaft is attached to the armature of a second generator, the magnetic field sections of the generators being connected together and attached to the outer case. As described in connection with FIG. 15, the torque converters 238 and 240 are so arranged with respect to their associated absorber/emitter surfaces as to drive their associated shafts 242 and 244 in opposite directions. As a result, the otheoscopic generator 232 is dynamically balanced.

The output terminals of generator 246 are connected to the input terminals of an induction coil 254 that may be similar to that illustrated in FIG. 14. Additionally, as in the apparatus embodiment of FIG. 28, a diode rectifier-capacitor circuit desirably is provided to convert the high voltage alternating current output of the induction coil to a high voltage direct current potential. A circuit similar to that shown in FIG. 29 is suitable for this purpose.

The high voltage direct current potential so obtained from the dual otheoscopic generator is applied, in parallel, to a first or upper air of spaced electrodes 256 and to a second or lower pair of spaced electrodes 258, as seen in FIG. 30. The spaced electrodes 256 are associated with a fan shaped bank of vanes of an upper torque converter of a second dual otheoscopic generator 260, being so polarized as to supplement the turning moment on the drive shaft connected to the torque converter that is provided by the associated absorber/emitter surface. The spaced electrodes 258 are similarly associated with the vanes of the lower torque converter of the otheoscopic generator 260, the electrodes 258 being polarized oppositely to that of the electrodes 256 since the turning moment produced by lower torque converter is opposite to that of the upper torque converter. The otheoscopic generator 260 may be similar to the otheoscopic generator 232, the output thereof being applied to an induction coil similar to the induction coil 254 and similarly rectified to provide a high voltage unidirectional potential output. Each successive otheoscopic generator may be somewhat larger than the preceding one, four such generators being shown in FIG. 30, thereby to provide a brigade creating increasingly higher voltage fields to drive increasingly more powerful dual otheoscopic generators, as indicated at 262 and 264.

Figure 31:
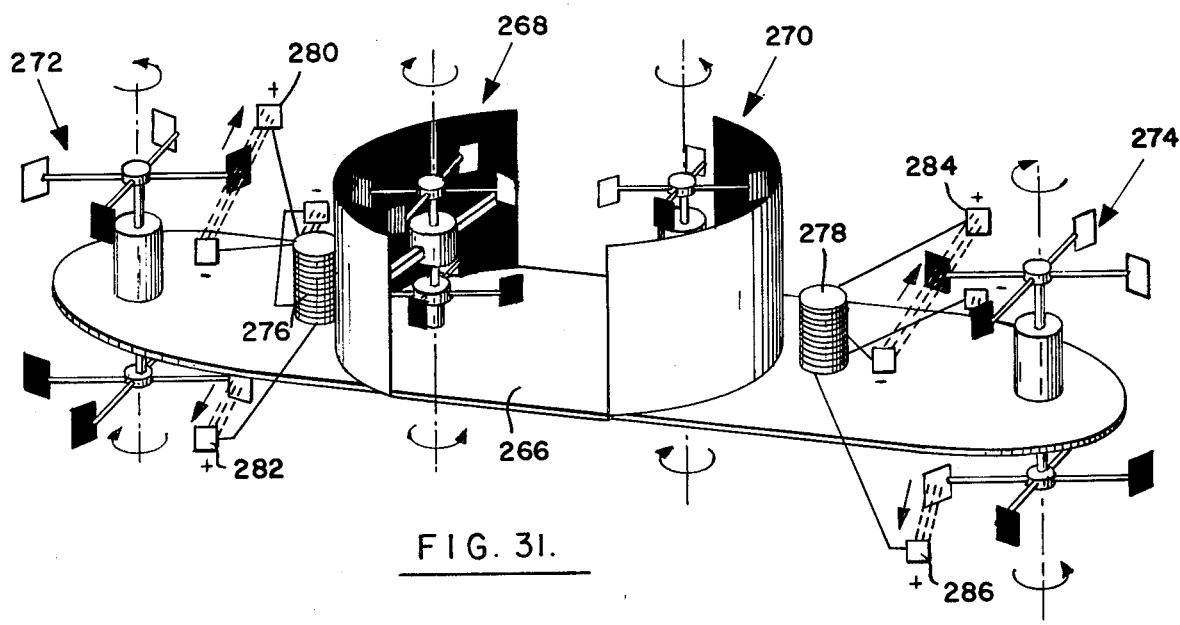
FIG. 31 illustrates another embodiment of a power amplification system using dual otheoscopic and also radiometric forms of generators in outer space.
Figure 32:
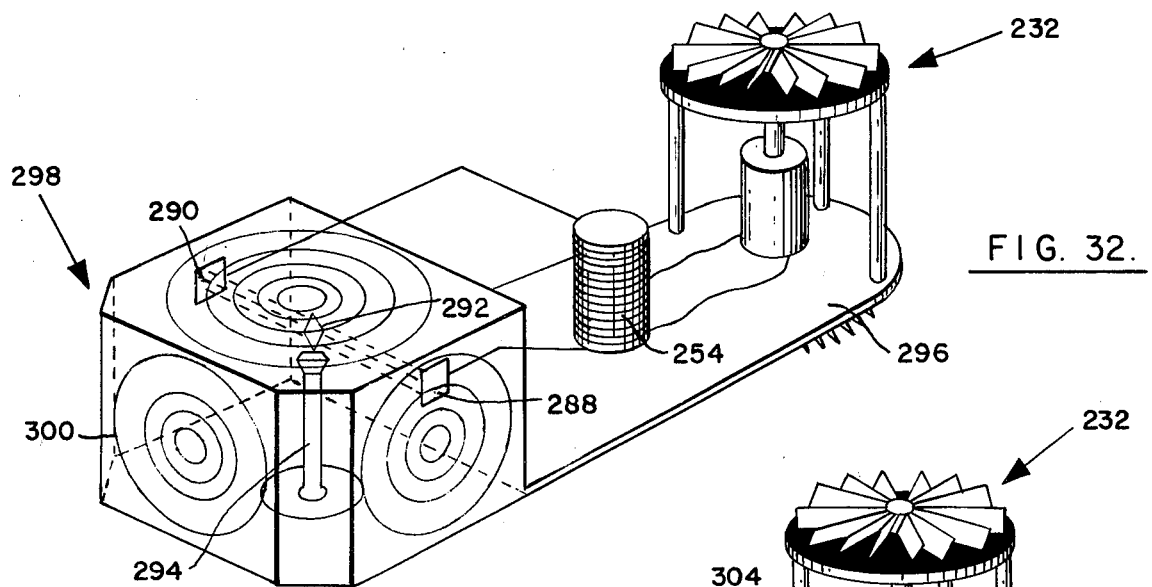
FIG. 32 illustrates an embodiment of the invention employed as a lighthouse in outer space.

FIG. 31 illustrates another embodiment of a power amplification system, according to the invention, that utilizes a combination of a plurality of otheoscopic generators and a plurality of radiometric generators. Thus, there is provided a platform 266 on which are mounted two otheoscopic generators 268 and 270, each of which may be similar to the otheoscopic generator illustrated in FIG. 15, and two radiometric generators 272 and 274, each of which may be similar to the generator illustrated in FIG. 27. Desirably, each of the radiometric generators 272 and 274 is enclosed in a glass or heat conducting container that is not shown to avoid undue complication of the drawing.

As illustrated, induction coils 276 and 278 are provided, being respectively associated with the otheoscopic generators and each including a suitable rectifier and capacitor as described in connection with FIGS. 28 and 29. As in the arrangement of FIG. 30, two pairs of electrodes 280 and 282, and 284,286 are provided in respective association with the outputs of each of the induction coils 276 and 278, and the circular path of the vanes of the radiometric generators 272 and 274. The polarities of the electrodes are so arranged that the molecular streams between electrodes supplements the turning moments provided by the absorber/emitter surfaces of the vanes of the respective radiometric generators, thereby providing increased power output therefrom.

FIG. 12 illustrates another modification of the invention comprisiing an otheoscopic form of radiation generator for use in outer space linked to an induction coil and spaced electrodes to produce photon emission from a gem stone. The light from the gem stone may be transmitted in substantially all coordinate directions through fresnel lenses. Thus, there is provided a self-contained arrangement that aptly may be termed a lighthouse in outer space.

The otheoscopic generator and induction coil of FIG. 12 may be similar to the dual otheoscopic generator 232 and the induction coil 254 of FIG. 30, and accordingly, have been designated by the same reference numbers. The output terminals of the induction coil 254 are connected through a diode rectifier and capacitor (not shown) to a pair of spaced electrodes 288 and 290, the latter having a positive potential. A gem stone 292 is positioned between the electrodes 288 and 290, being mounted on a pedestal 294. The pedestal 294, induction coil 254 and generator 232 are all supported on a base plate 296. The gem stone 292 is positioned centrally of a box-like container 298 that is also supported on the base plate 296. Each wall of container 298 includes a fresnel lens 300 in that side of container 298.

Figure 33:
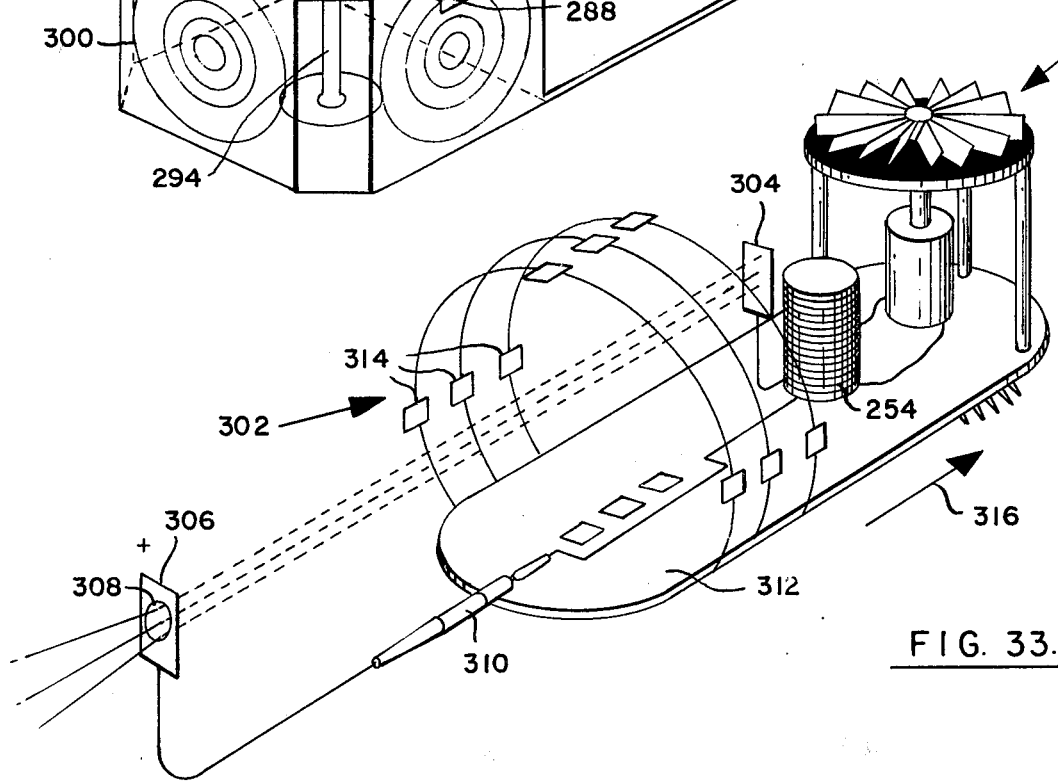
FIG. 33 illustrates an embodiment of the invention employed as a propulsive mechanism in outer space.

FIG. 33 illustrates an otheoscopic form of radiation generator linked to an induction coil for producing a molecular stream of high velocity in a given direction thereby to provide means of propulsion in outer space, specifically a form of rocket engine, for a space craft indicated by the reference numeral 302. Since it is known that the shape and direction of a high-voltage, high velocity stream can be influenced by a magnetic field, advantage is taken of this in the arrangement of FIG. 33 to direct the electrical field by changing the magnetic field strength.

The otheoscopic radiation generator and induction coil of FIG. 33 may be similar to the dual otheoscopic generator 232 and induction coil 254 of FIG. 30, and in FIG. 33, have been designated by those numerals. In practice, it is contemplated that several such otheoscopic generator and induction coil arrangements as illustrated in FIG. 30, would be utilized. The output terminals of induction coil 254 are connected through a suitable diode rectifier and capacitor, not shown, to a pair of spaced electrodes, indicated at 304 and 306, the latter being the positive electrode. Electrode 306 has the form of a plate with a centrally located opening indicated at 308 and is positioned on the end of a rudder 310. Rudder 310 is carried at the rear of a platform 312, being mounted on a suitable universal joint. Otheoscopic generator 232 and induction coil 254 are shown mounted on the platform 312, forwardly thereof. Also mounted on platform 312, by means not shown, are a plurality of spaced magnetic coils, indicated at 314, that are positioned about and along a portion of the length of the path of the high velocity electrical stream between the negative electrode and 304 and the positive electrode 306. As those skilled in the art understand, reaction between the magnetic fields established by the magnetic coils 314 and the magnetic field established by the high velocity electrical stream about itself is effective to deflect the stream laterally and vertically in accordance with the relative directions and intensities of the magnetic fields produced by the spaced coils 314. It will be understood that electrical current for energizing the coils 314 may be obtained from another or even several otheoscopic generators of a type similar to the generator 232.

In FIG. 33 it is contemplated that a portion of the high velocity molecular stream directed toward the positive electrode or plte 306 escapes through the opening 308 providing a force on the negative electrode 304 that is unopposed, and accordingly, that is useful to propel the space craft 302 in the opposite direction, that indicated by the arrow designated by the numeral 316. Since the shape and direction of the high-voltage, high velocity stream can be influenced by a magnetic field, advantage is taken of this to direct the stream by changing the relative magnetic field strengths, longitudinally of the stream, in each of the four quadrants about the stream. Thus, for example, deflection of the stream effected to the left rear or port side, as seen in FIG. 33, will result in the craft turning its bow to starboard. It is contemplated that the strength and spatial intensity of the magnetic fields established by coils 314 would be activated by navigational and computer equipment of conventional or known type, not shown.

Without a magnetic field as produced by magnetic coils 314 present, it will be understood that control of the direction of the craft could be obtained by mechanical movement of the position of the positive electrode or plate 306, as by mechanical deflection of the rudder 310 about its universal mounting, thereby enabling manual adjustment of the direction in which space craft 302 is propelled.

Figure 34:
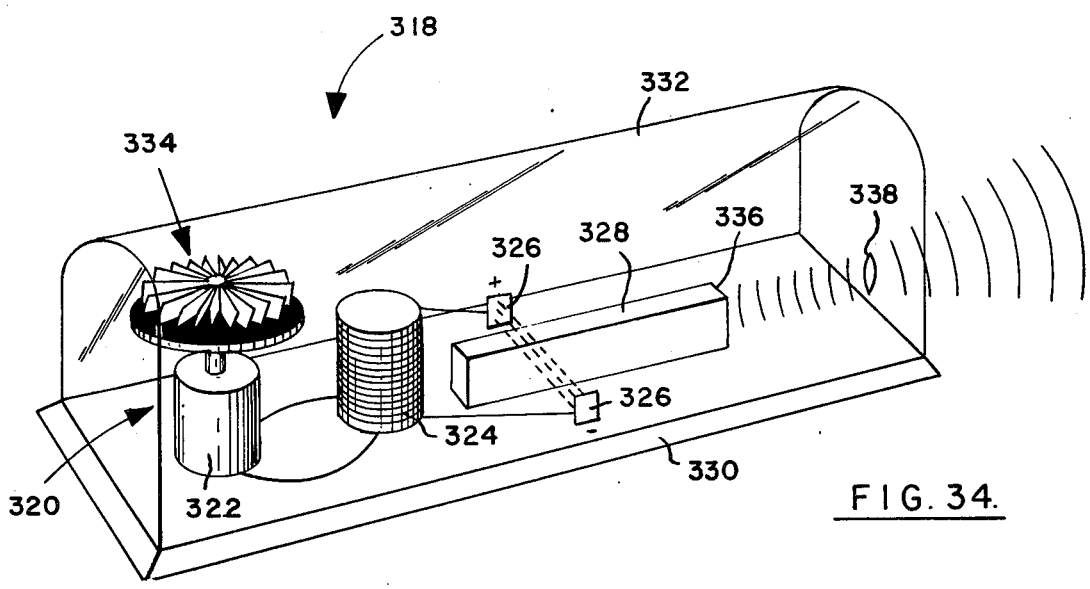
FIG. 34 illustrates an embodiment of the invention for providing a source of coherent light.

FIG. 34 illustrates an embodiment of the invention that provides a self contained source of coherent light. Thus, there is provided in FIG. 34 a self-contained laser system indicated at 318 comprising an otheoscopic generator 320, a dynamoelectric machine or electric generator 322, an induction coil 324, spaced electrodes 326, a gem stone 328, a base 330 and a glass enclosure 332.

The otheoscopic generator 320 may be of the type illustrated in FIG. 1 and includes a fan shaped torque converter 334 that is connected to the drive shaft of generator 322. The induction coil 324, which may be of the type illustrated in FIG. 14, has its input connected to the output terminals of generator 322. The output terminals of induction coil 324 has its output terminals connected through a suitable rectifier and capacitor, not shown, for converting the high-voltage alternating current output to a high voltage unidirectional voltage output, as described in connection with FIG. 29. The negative output terminal of induction coil 324 is applied to one of the spaced electrodes 326, and the positive terminal is applied to the other one of the electrodes 326. Gem stone 328, desirably a ruby rod, having a half silvered mirrored surface at one end, is placed between the spaced electrodes 326 for bombardment by the electrical field established by the electrodes in a direction perpendicular to the long axis of the ruby rod. The various otheoscopic generator laser components are suitably mounted on the base 330 and located within glass container 332 which is suitably evacuated.

In the operation of the laser system, the high-voltage electrical field established between the electrodes 326 stimulates the ruby rod 328 to the emission of light. Stimulated emission of light occurs, as is known in the art, as radiant energy travelling back and forth between the mirrored surfaces at the ends of the long axis of the ruby rod 328 builds up to a level of magnitude enabling it to escape through the escape half-silvered morror surface indicated at 336 as a spaced frequency distribution of coherent light. In FIG. 34 a lens 338 is provided in the wall of container 332 for diverging or converging the radiation emitted by the ruby rod 328, as needs vary. Other kinds of lenses may be employed, if desired.

There has thus been provided, according to the present invention self-contained radiometric and otheoscopic generator system and several variations, combinations and cluster arrangements thereof for generating electrical energy from incident radiation emanating from external environmental sources including the sun or any source of infra-red energy whether derived from space, the air, land or water.

Where the development of an increased electrical output, voltage or current, from the available environmental radiation is desired or required, it has been shown that the electrical outputs of a plurality of otheoscopic and/or radiometric generators may be connected in series or parallel, the series connection providing an increased voltage output and the parallel connection an increased current output.

Additionally, for the development of increased kinetic energy from the incident radiation and correspondingly increased electrical energy from each otheoscopic or radiometric generator, it has been shown that several torque converters each having its own bank or plurality of vanes may be associated with the drive shaft of the generator, arranged either in tandem or in parallel, appropriate gearing being provided for the parallel arrangement, and that further increase in the electrical energy output may be provided by arranging the generator combinations in clusters, particularly, for use in outer space.

Embodiments of the invention involving dual otheoscopic generators linking power amplifiers in a chain or brigade thereby to provide more powerful generators have also been provided. The use of the invention for space ship propulsion also is illustrated.

Embodiments of the invention have also been provided for self-contained photon-emitting devices, providing for example, beacons or lighthouses in space and for providing coherent source of light.

I claim:

1. An electric generator comprising a dynamoelectric machine having an input drive shaft and output electrical terminals, a torque converter having an output member connected to rotate said drive shaft and energy receiving means for driving said drive shaft, and means including a radiation absorber/emitter surface operatively associated with said torque converter for absorbing radiation and transmitting it to nearby gas molecules and imparting energy to them to cause them to travel and impart energy to said energy receiving means, said absorber/emitter surface and nearby gas molecules imparting kinetic energy to said torque converter responsively to incident radiation.

2. A generator as specified in claim 1 wherein said torque converter energy receiving means includes a plurality of movable vanes that radiate from said output member about an axis coincident with said drive shaft.

3. A generator as specified in claim 2 wherein said absorber/emitter surface means includes a black surface formed on a plate that has good heat conductivity and is positioned adjacent the path of movement of said movable vanes.

4. A generator as specified in claim 3 wherein said plate is flat and said movable vanes comprise the vanes of a circular fan.

5. A generator as specified in claim 3 wherein said output member includes a center disc that is attached to the end of said drive shaft, and wherein said plate is curved to provide a semicircular cylindrical portion, and wherein each of said movable vanes is attached to the end of an associated rod that is attached to and radiates from said center disc, the angle subtended by each vane with respect to said curved plate being such that molecular disturbance emanating from the absorber/emitter surface of said curved plate produces a turning moment on said vane.

6. A generator as specified in claim 2 including an evacuated container, said torque converter and said absorber/emitter surface being positioned within said container, and wherein said absorber/emitter surface comprises a blackened radiant energy absorbant surface that is provided on one face of each of said vanes, the other face being bright, with the blackened surfaces all facing in the same direction around said output member, and with each of said vanes so positioned as to have at least a component of the blackened surface thereof parallel to the shaft of said dynamoelectric machine.

7. A generator as specified in claim 2 wherein a surface of each said vanes is so positioned as to be substantially parallel to the drive shaft of said dynamoelectric machine.

8. A generator as specified in claim 2 including an evacuated container and a base plate for said container, and wherein said dynamoelectric machine, torque converter and absorber/emitter surface are supported on said base plate within said container.

9. A generator as specified in claim 8 including a fresnel lens and a parabolic lens, said lenses being positioned externally of said container, one on one side thereof and one on the other, and each directing environmental radiation toward said absorber/emitter surface.

10. A generator as specified in claim 9 including a heat pipe comprising a radiant energy source and a collimator positioned between said heat pipe and said fresnel lens for directing rays of radiant energy to said fresnel lens and for making them parallel whereby said rays of radiant energy are concentrated by said fresnel lens on said absorber/emitter surface.

11. A generator as specified in claim 10 including at least one actuatable electrical device supported on said base plate within said container, said electrical device being connected to the output electrical terminals of said dynamoelectric machine.

12. A generator as specified in claim 11 wherein said actuatable electrical device comprises an electric lamp, and further including a meter within said container connected to the output electrical terminals of said dynamoelectric machine.

13. A generator as specified in claim 8 wherein said dynamoelectric machine produces direct electrical current and wherein said evacuated container includes a pair of terminals positioned in a wall thereof, said pair of terminals being connected to the output terminals of said dynamoelectric machine.

14. A generator as specified in claim 8 including an induction coil having a pair of input terminals and a pair of output terminals, a pair of electrodes, and a gem stone positioned within said container between said electrodes, the input terminals of said induction coil being connected to the output terminals of said dynamoelectric machine, the output terminals of said induction coil being connected to said electrodes, and said gem stone being positioned between said electrodes so that it is activated by the emissions from the electrodes.

15. A generator as specified in claim 1 wherein said dynamoelectric machine includes a second input drive shaft disposed in axial alignment with said first mentioned input drive shaft, and further including a second torque converter having an output member connected to rotate said second drive shaft, said second torque converter being so arranged with respect to said radiation absorber/emitter surface that the latter and nearby gas molecules impart kinetic energy to said second torque converter, responsively to incident radiation, in a sense opposite to the kinetic energy imparted to said first mentioned torque converter.

16. A generator as specified in claim 15 wherein said first and second input drive shafts are positioned at the opposite ends of said dynamoelectric machine, and said absorber/emitter surface is provided on a plate that is curved to provide a semi-circular cylindrical portion, and wherein each of said torque converters includes a center disc attached to the end of each of said input drive shafts, a plurality of rods radiating from each of said centers discs, and a vane carried on the end of each of said rods for movement in a path closely adjacent said semi-circular cylindrical portion of said plate.

17. A generator as specified in claim 15 wherein each of said torque converters includes a plurality of movable vanes, wherein the vanes associated with each of said torque converters comprise the vanes of an individual circular fan, and wherein said radiation/emitter surface is formed on one surface of each of a pair of oppositely disposed parallel plates, said one surface of each of said plates being positioned adjacent the path of movement of the vanes of an associated one of said circular fans.

18. A generator as specified in claim 15 wherein a second radiation absorber/emitter surface is associated with said second torque converter, said second absorber/emitter surface and nearby gas molecules imparting kinetic energy to said second torque converter responsively to incident radiation, said first and second torque converters each including a plurality of movable vanes that radiate respectively from the associated output member of said first and second torque converters about an axis coincident with said aligned first and second input drive shafts of said dynamoelectric machine, all of said vanes being so positioned as to be substantially parallel to said aligned drive shafts, and wherein said first and second radiation absorber/emitter surfaces respectively associated with said first and second torque converters each comprise a blackened radiant energy absorbant and emitting surface provided on one face of each the vanes of the associated torque converter, the other face being bright, with the blackened surfaces of the vanes of said first torque converter all facing in one direction around the shaft of said dynamoelectric machine and the blackened surfaces of the vanes of said second torque converter facing in the opposite direction.

19. A generator as specified in claim 1 including at least one additional torque converter having an output member connected to said drive shaft of said dynamoelectric machine, and a radiation absorber/emitter surface associated with each such additional torque converter, each such additional radiation absorber/emitter surface and nearby gas molecules imparting kinetic energy to the associated additional torque converter in the same sense as the kinetic energy imparted to said first mentioned torque converter by said first mentioned absorber/emitter surface and nearby gas molecules responsively to incident radiant energy.

20. A generator as specified in claim 19 wherein said torque converters are connected in tandem to said drive shaft of said dynamoelectric machine.

21. A generator as specified in claim 19 wherein said torque converters are connected in parallel to said drive shaft of said dynamoelectric machine.

22. A generator as specified in claim 2 wherein said dynamoelectric machine provides direct electrical current at its output electric terminals and including at least another torque converter having movable vanes and associated absorber/emitter surface that are similar to the first mentioned torque converter and absorber/emitter surface, an induction coil having a pair of input electrical terminals and a pair of output electrical terminals, electrical rectifying means, and a pair of spaced electrodes, said input terminals of said induction coil being connected to said output electrical terminals of said dynamoelectric machine, said output terminals of said induction coil being connected through said rectifying means to said spaced electrodes whereby an alternating electrical current output of said induction coil is converted to a direct current potential output that is applied to said spaced electrodes, said spaced electrodes being positioned to intercept a portion of the path of the movable vanes of said another torque converter whereby a molecular stream established between said electrodes by said direct current potential output impinge upon said last mentioned movable vanes to supplement the kinetic energy output of said second torque converter.

23. An electric generator comprising
a dynamoelectric machine having an input drive shaft and output electrical terminals,
a torque converter connected to said shaft,
said torque converter including a plurality of lightweight vanes radially connected to said shaft,
radiation absorber/emitter means for driving said vanes and rotating said shaft,
said absorber/emitter means including surface means for absorbing radiant energy and heating up and emitting heat to agitate nearby gas molecules and thereby create a molecular wind that rotates said vanes to rotate said input drive shaft of said dynamoelectric machine and generate electricity.

24. A power amplifier comprising a plurality of dual otheoscopic generators and individually associated dynamoelectric machines linked into a chain to produce increasingly more powerful generators, said otheoscopic generators each including a plurality of movable vanes, said amplifier further including a plurality of pairs of spaced electrodes, a plurality of rectifying means, and a plurality of induction coils each having an input associated with the output and an individual one of said dynamoelectric machines and an output associated with one of said rectifying means, the output of each of said rectifying means being applied between the spaced electrodes of an associated one of said pairs of spaced electrodes, successive ones of said pairs of spaced electrodes being positioned to intercept a portion of the path of the movable vanes of the successive otheoscopic generator in the chain whereby a molecular stream established between pairs of said electrodes impinge upon said movable vanes to supplement the kinetic energy output of said successive generator.

25. A power amplifier as specified in claim 24 wherein each of said dynamoelectric machines includes a pair of oppositely disposed rotary drive shafts, and an otheoscopic generator of each of said dual otheoscopic generators being associated with an individual one of each of said shafts, the direction of rotation of each of said shafts being in opposite directions whereby each of said dynamoelectric machines are dynamically balanced.

26. A power amplifier as specified in claim 25 wherein the electrodes of each of the pairs of spaced electrodes associated with the otheoscopic generators of each dual otheoscopic generator are oppositely polarized whereby the individual molecular streams established between the pairs of electrodes and impinging upon the movable vanes of the associated otheoscopic generator of each dual otheoscopic generator are oppositely directed and have a minimal effect on the dynamic balance of the associated dynamoelectric machine.

27. An electric generator as specified in claim 1 further including means providing an evacuated space, said dynamoelectric machine, torque converter and absorber/emitter surface being wholly contained within said evacuated space.

* * * * *